United States Patent
Woo (10) Patent No.: US 12,145,287 B2
(45) Date of Patent: Nov. 19, 2024

(54) SUPERABSORBENT POLYMER HYDROGEL CHOPPING DEVICE

(71) Applicant: LG CHEM, LTD., Seoul (KR)

(72) Inventor: Heechang Woo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 344 days.

(21) Appl. No.: 17/640,606

(22) PCT Filed: Feb. 18, 2021

(86) PCT No.: PCT/KR2021/002085
§ 371 (c)(1),
(2) Date: Mar. 4, 2022

(87) PCT Pub. No.: WO2021/172813
PCT Pub. Date: Sep. 2, 2021

(65) Prior Publication Data
US 2022/0339811 A1    Oct. 27, 2022

(30) Foreign Application Priority Data

Feb. 28, 2020 (KR) .................. 10-2020-0025131
Dec. 9, 2020 (KR) .................. 10-2020-0171498

(51) Int. Cl.
*B26D 3/24* (2006.01)
*B02C 18/30* (2006.01)
(Continued)

(52) U.S. Cl.
CPC .............. *B26D 3/24* (2013.01); *B02C 18/30* (2013.01); *B26D 5/22* (2013.01); *B26D 7/0641* (2013.01); *B26D 7/0666* (2013.01)

(58) Field of Classification Search
CPC ......... B02C 18/30; B02C 18/08; B02C 18/10; B02C 18/2216; B02C 18/2258;
(Continued)

(56) References Cited

U.S. PATENT DOCUMENTS 4,446,261 A   5/1984   Yamasaki et al.
4,595,148 A   6/1986   Luerken et al.
(Continued)

FOREIGN PATENT DOCUMENTS

CN   105128166 A   12/2015
CN   206030293 U   3/2017
(Continued)

OTHER PUBLICATIONS

Machine translation of JP-2006346942-A (Year: 2006).*
(Continued)

*Primary Examiner* — Christopher L Templeton
*Assistant Examiner* — Teresa A Guthrie
(74) *Attorney, Agent, or Firm* — Morgan, Lewis & Bockius LLP (57) ABSTRACT

A superabsorbent polymer hydrogel chopping device is provided. The superabsorbent polymer hydrogel chopping device includes a barrel body having a transfer space to which a hydrogel is transferred therein and a discharge portion through which the hydrogel is discharged is formed to face in a ground direction, a transfer unit installed in the barrel body and configured to transfer the hydrogel in the transfer space, a cutter member installed in the barrel body and configured to pulverize the hydrogel transferred by the transfer unit, and a perforated plate configured to discharge particles of the hydrogel pulverized by the cutter member to the outside of the barrel body.

12 Claims, 10 Drawing Sheets

(51) Int. Cl.
*B26D 5/22* (2006.01)
*B26D 7/06* (2006.01)

(58) Field of Classification Search
CPC ..... B02C 19/0056; B02C 19/22; B02C 26/16; B02C 17/16; B02C 17/163; B02C 2023/165; B26D 3/24; B26D 5/22; B26D 7/0666; B26D 7/0641
USPC ...................................................... 241/186.5
See application file for complete search history.

(56) References Cited

U.S. PATENT DOCUMENTS

| | | | |
|---|---|---|---|
| 5,629,034 | A | 5/1997 | Terada et al. |
| 2007/0082389 | A1 | 4/2007 | Clark et al. |
| 2009/0305884 | A1 | 12/2009 | Sakamoto et al. |
| 2015/0218335 | A1 | 8/2015 | Kirchooff et al. |
| 2016/0207226 | A1 | 7/2016 | Torii et al. |
| 2018/0214886 | A1 | 8/2018 | Holcomb et al. |
| 2019/0275192 | A1 | 9/2019 | Torii et al. |
| 2022/0203375 | A1 | 6/2022 | Woo |
| 2022/0258380 | A1 | 8/2022 | Choi et al. |

FOREIGN PATENT DOCUMENTS

| | | | |
|---|---|---|---|
| CN | 208052339 | U | 11/2018 |
| EP | 3939756 | A1 | 1/2022 |
| EP | 3984711 | A1 | 4/2022 |
| JP | S53-117666 | U | 2/1977 |
| JP | S56-161408 | A | 12/1981 |
| JP | S57-158209 | A | 9/1982 |
| JP | S57-198714 | A | 12/1982 |
| JP | 2000-063527 | A | 2/2000 |
| JP | 2004-330143 | A | 11/2004 |
| JP | 2006-346942 | A | 12/2006 |
| JP | 2007-511759 | A | 5/2007 |
| JP | 2022-529704 | A | 6/2022 |
| JP | 2022-541140 | A | 9/2022 |
| KR | 10-1998-0066249 | A | 10/1998 |
| KR | 100210425 | B1 * | 7/1999 |
| KR | 10-0928690 | B1 | 11/2009 |
| KR | 10-2016-0020864 | A | 2/2016 |
| KR | 10-2016-0048842 | A | 5/2016 |
| KR | 10-2016-0078114 | A | 7/2016 |
| WO | 2015/030130 | A1 | 3/2015 |
| WO | 2016/105119 | A1 | 6/2016 |

OTHER PUBLICATIONS

Machine translation of KR-100210425-B1 (Year: 1999).*
Extended European Search Report dated Nov. 7, 2022 issued in the European Patent Application No. 21759834.1.
International Search Report (with partial translation) and Written Opinion dated Jun. 7, 2021, for corresponding International Patent Application No. PCT/KR2021/002085.

* cited by examiner

SUPERABSORBENT POLYMER HYDROGEL CHOPPING DEVICE

CROSS-REFERENCE TO RELATED APPLICATION

This application claims priority to and the benefit of Korean Patent Application No. 10-2020-0025131 filed in the Korean Intellectual Property Office on Feb. 28, 2020, and Korean Patent Application No. 10-2020-0171498 filed in the Korean Intellectual Property Office on Dec. 9, 2020, the entire contents of which are incorporated herein by reference.

The present invention relates to a superabsorbent polymer hydrogel chopping device capable of smoothly chopping a hydrogel.

TECHNICAL FIELD

Background Art

A super absorbent polymer (SAP) is a synthetic polymer material that may absorb water 500 to 1,000 times its own weight, and each developer calls the SAP by other names such as super absorbency material (SAM) or absorbent gel material (AGM), etc. The SAP as described above began to be put to practical use as a sanitary tool, and presently, is widely used as a soil repair agent for gardening, a water-stop material for civil engineering and construction, a sheet for seeding, a freshness maintenance agent in a food distribution field, a material for poultice, etc., as well as for hygiene products such as children's paper diapers.

As a method for preparing the SAP as described above, a method based on inverse suspension polymerization or a method based on aqueous solution polymerization is known. Inverse suspension polymerization is disclosed, for example, in Japanese Patent Laid-Open Publication Nos. 56-161408, 57-158209, and 57-198714. As the method based on aqueous solution polymerization, a thermal polymerization method in which a hydrogel polymer is broken, cooled, and polymerized in a kneader equipped with several shafts, and a photopolymerization method in which a high concentration aqueous solution is irradiated with ultraviolet rays or the like on a belt to perform polymerization and drying simultaneously, and the like are known.

A hydrogel or hydrogel polymer obtained through the polymerization reaction as described above is generally pulverized through a drying process and then comes to the market as a powdery product. In order to efficiently perform the drying step as described above, it is important to increase a surface area of the hydrogel polymer as much as possible. Therefore, in order to increase the surface area of the hydrogel polymer before the drying process, a method of simply pulverizing the hydrogel polymer polymerized through thermal polymerization or photopolymerization and increasing the surface area of the hydrogel polymer to be dried may be considered. In order to increase the surface area of the hydrogel polymer as described above, a process of primarily pulverizing the hydrogel polymer after polymerization is disclosed.

A chopper is mainly used in a primary pulverizing process of the hydrogel.

The chopper includes a screw for moving the hydrogel, a barrel including a spiral, a cutter blade for cutting the hydrogel, and a perforated plate through which the cut hydrogel is discharged.

The chopper is installed to be horizontal on the ground, and the hydrogel may be transferred in a horizontal direction of the ground according to an operation of the screw and may be cut in the perforated plate.

However, it is difficult for the hydrogel to be pressed with a uniform pressure and cut on the perforated plate by an action of gravity, so that the chopping operation is not performed smoothly.

DISCLOSURE

Technical Problem

The present invention has been made in an effort to provide a superabsorbent polymer hydrogel chopping device having advantages of pressing a hydrogel on a perforated plate with a uniform pressure so as to be stably chopped to have a size smaller than a preset size and improving manufacturing quality.

Technical Solution

An exemplary embodiment of the present invention provides a superabsorbent polymer hydrogel chopping device including: a barrel body having a transfer space to which a hydrogel is transferred therein and a discharge portion through which the hydrogel is discharged is formed to face in a ground direction; a transfer unit installed in the barrel body and configured to transfer the hydrogel in the transfer space; a cutter member installed in the barrel body and configured to pulverize the hydrogel transferred by the transfer unit; and a perforated plate configured to discharge particles of the hydrogel pulverized by the cutter member to the outside of the barrel body.

The barrel body may be formed to have a length long in a direction of gravity so that the discharge portion is installed to face the direction of gravity. An input hopper may be installed on a side surface of the barrel body and configured to input the hydrogel into the transfer space. The input hopper may be installed to be inclined to a side surface of the barrel body.

The barrel body may be installed to be supported on a floor surface by a support base.

The support base may include: a support body installed on side surface of the barrel body; and a plurality of support bars radially protruding from the support body and supported on the floor surface.

The transfer unit may include: a screw member rotatably installed in an inside of the transfer space and configured to move the hydrogel; and a driving motor configured to provide a rotation driving force to the screw member.

The cutter member may be rotatably installed in the screw member in a position of the discharge portion.

The cutter member may be installed in plurality in the screw member.

The barrel body may be installed to be inclined to the support base in a direction staggered with respect to a direction of gravity in the support base.

The support base may include: a support body installed in an annular shape and spaced apart from an outer surface of the barrel body on a side surface of the barrel body; a plurality of support bars protruding from the support body and supported on a floor surface; and a hinge portion configured to rotatably connect the support body to a side surface of the barrel body.

The barrel body may be configured to be rotatably installed in the support base by a driving operation of a driving unit.

The driving unit may be a cylinder member in which a rod is rotatably connected to a side surface of the barrel body.

The transfer unit may include: a screw member rotatably installed in the transfer space and configured to move the hydrogel; a driving motor connected to one end of the screw member and configured to provide a rotational driving power; a screw extension portion extending from the other end of the screw member and protruding to the outside of the discharge portion; and a support portion installed on an outer side of the discharge portion and configured to support the screw extension portion.

The support portion may include: a support housing protruding to the outside of the discharge portion and including a discharge space to which the pulverized hydrogel particles are discharged; and a rotation support portion installed in the support housing and configured to rotatably support the screw extension portion.

The rotation support portion may include: an insertion portion installed in the discharge space of the support housing and configured to rotatably support the inserted screw extension portion; and a plurality of ribs configured to connect the insertion portion to an inner wall surface of the support housing.

A bearing member configured to rotatably support the screw extension portion may be installed in the insertion portion.

Advantageous Effects

According to an exemplary embodiment of the present invention, a perforated plate is installed in a position of a discharge portion to which a hydrogel is discharged in a state in which the discharge portion faces in a direction of gravity, and the hydrogel is chopped in a state of being uniformly pressed on the perforated plate, and thus, the hydrogel may be uniformly chopped, thereby improving manufacturing quality of an absorbent polymer.

According to an exemplary embodiment of the present invention, in a state in which the discharge portion to which the hydrogel is discharged is positioned to be inclined in a direction of a ground, the hydrogel passes through the perforated plate so as to be chopped, thereby performing a stable chopping operation according to a transfer amount of the hydrogel.

MODE FOR INVENTION

Hereinafter, the present invention will be described more fully hereinafter with reference to the accompanying drawings, in which exemplary embodiments of the invention are shown. As those skilled in the art would realize, the described exemplary embodiments may be modified in various different ways, all without departing from the scope of the present invention. The drawings and description are to be regarded as illustrative in nature and not restrictive. Like reference numerals designate like elements throughout the specification.

Figure 1:
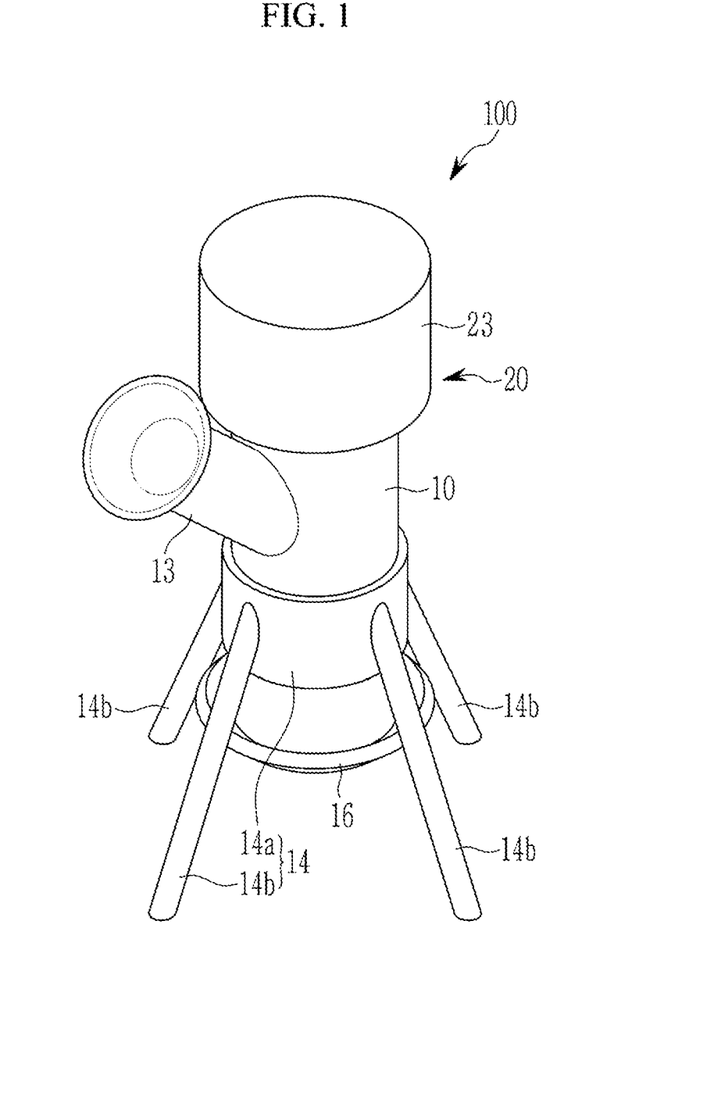
FIG. 1 is a perspective view schematically illustrating a superabsorbent polymer hydrogel chopping device according to a first exemplary embodiment of the present invention.
Figure 2:
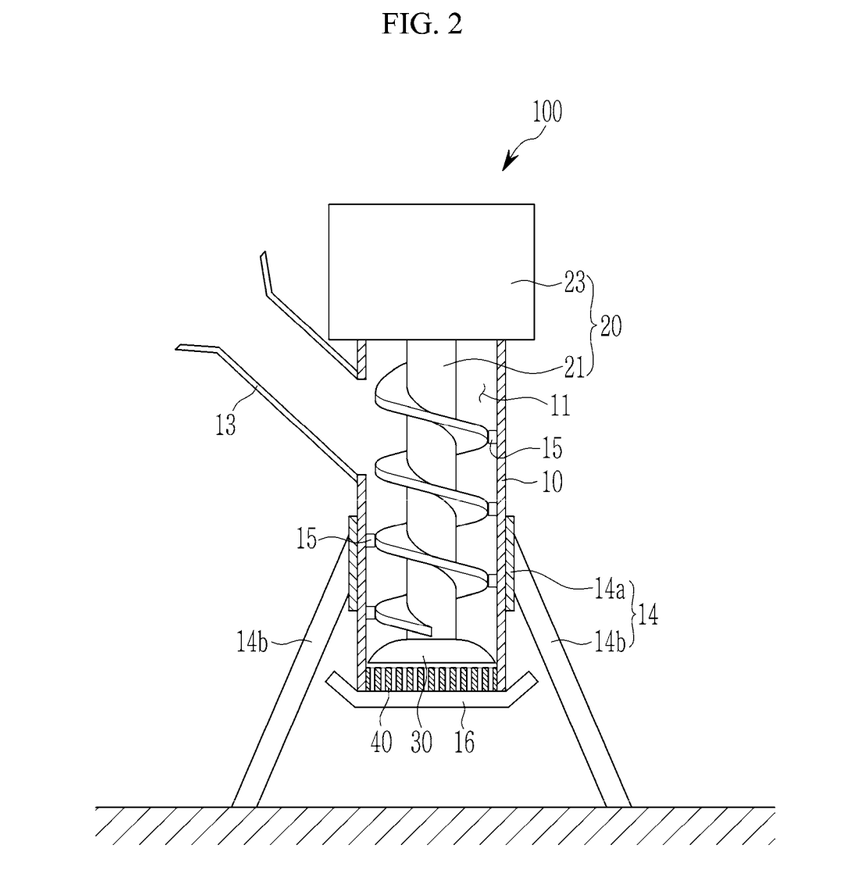
FIG. 2 is a cross-sectional view schematically illustrating a major portion of the superabsorbent polymer hydrogel chopping device of FIG. 1.
Figure 3:
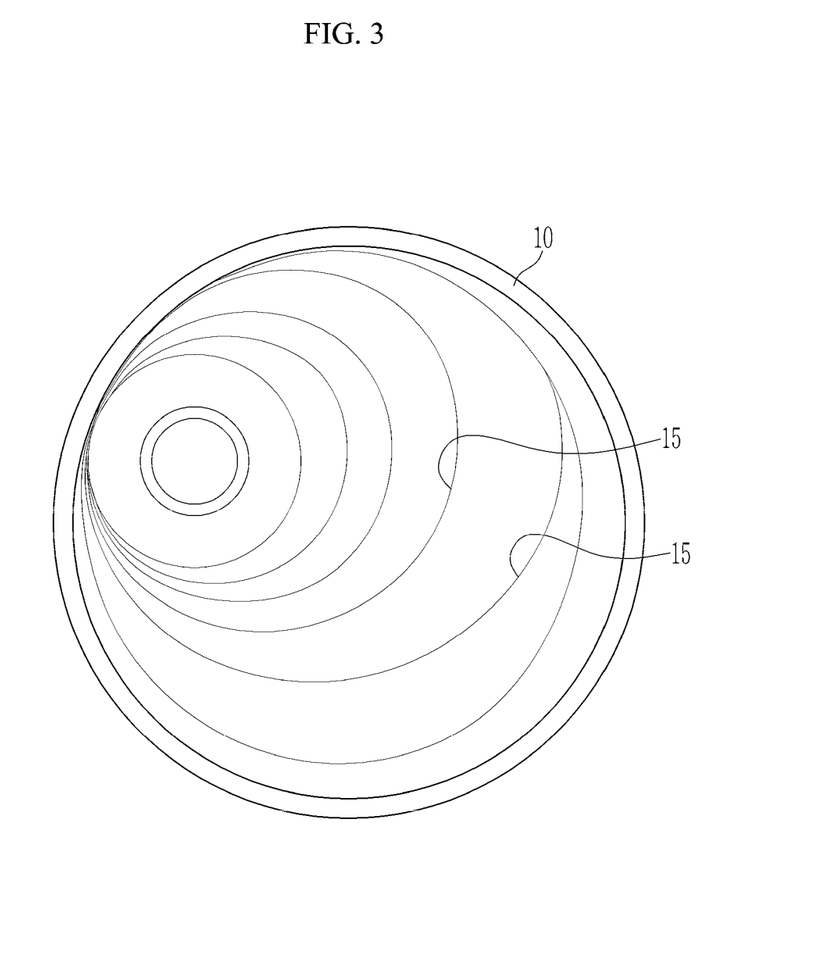
FIG. 3 is a view of a major portion schematically illustrating a state in which a barrel spiral is formed on an inner wall surface of a barrel body of FIG. 1.

FIG. 1 is a perspective view schematically illustrating a superabsorbent polymer hydrogel chopping device according to a first exemplary embodiment of the present invention, FIG. 2 is a cross-sectional view schematically illustrating a major portion of the superabsorbent polymer hydrogel chopping device of FIG. 1, and FIG. 3 is a view of a major portion schematically illustrating a state in which a barrel spiral is formed on an inner wall surface of a barrel body of FIG. 1.

As illustrated in FIGS. 1 to 3, a superabsorbent polymer hydrogel chopping device 100 according to the first exemplary embodiment of the present invention includes a barrel body 10 having a transfer space in which hydrogel is transferred and a discharge portion through which the hydrogel is discharged is formed to face in a ground direction, a transfer unit 20 installed at the barrel body 10 and configured to transfer the hydrogel in the transfer space 11, a cutter member 30 installed in the barrel body 10 and configured to pulverize the hydrogel transferred by the transfer unit 20, and a perforated plate 40 configured to discharge particles of the hydrogel pulverized by the cutter member 30 to the outside of the barrel body 10.

In the barrel body 10, the transfer space 11 in which hydrogel is transferred is formed in a length direction, and the barrel body 10 may be installed to be supported on a floor surface.

An input hopper 13 for introducing hydrogel into the transfer space 11 may be installed at an upper portion of the barrel body 10. The input hopper 13 may be installed to protrude one side of the barrel body 10 and may communicate with the transfer space 11 inside the barrel body 10 so that the hydrogel may be introduced into the transfer space 11.

One side of the input hopper 13 may be connected to a side surface of the barrel body 10 and the other side thereof may protrude upwardly.

That is, the input hopper 13 is installed to be inclined upwardly on one side of the barrel body 10, so that an operator may easily inject the hydrogel into the barrel body 10.

It is described, for example, that one input hopper 13 is installed and slopingly protruding from the side of the barrel body 10, but the present invention is not necessarily limited thereto, and a modification in which multiple, e.g., two or more, input hoppers may protrude according to a change in an input position and input amount of the hydrogel may also be appropriately applied.

In addition, it is also possible to install the input hopper 13 such that a position of an opening through which the hydrogel is input has a bellows type in which a diameter and a length of the opening is changed by stages.

The barrel body 10 may be provided with a support base 14 for stable support on the floor surface.

The support base 14 may include a support body 14a installed on a side surface of the barrel body 10 and a plurality of support bars 14b radially protruding from the support body 14a and supported on the floor surface.

Of course, the support base 14 is not necessarily limited to the support body 14a and the support bar 14b, and may be variously modified and applied as a support block type installed on the floor surface and fixed as a fixing unit to fix the barrel body 10 located at the center.

It is also possible that the barrel spiral 15 protrudes from the inside of the barrel body 10.

As shown in FIG. 3, the barrel spiral 15 may be formed to have a plurality of spiral shapes protruding from an inner wall surface of the barrel body 10 in the opposite direction to correspond to the spiral shape of the screw member 21. In the present exemplary embodiment, it is described that the barrel spiral 15 protrudes from the inner wall surface of the barrel body 10, but the present invention is not necessarily limited thereto and the barrel spiral 15 may not be formed.

The barrel spiral 15 is not necessarily limited to the spiral shape, and variously modified and applied as a concentric band-like projection on the inner wall surface of the barrel body 10 or a spherical or angular projection protruding to correspond to the spiral position of the screw member 21.

As such, since the barrel spiral 15 protrudes in the inside of the barrel body 10, the barrel spiral 15 may stably transfer the hydrogel, as well as an auxiliary action to cut the hydrogel.

Meanwhile, the barrel body 10 may be installed on the support base 14 in a state of being extended in a length long in a direction of gravity action in this exemplary embodiment.

That is, the barrel body 10 is formed in a cylindrical shape and the discharge portion from which the hydrogel is discharged is installed to face in a ground direction, that is, the direction of gravity, so that a flow direction of the hydrogel may be directed toward the direction of gravity.

Accordingly, since hydrogel particles are moved in the direction of gravity in the transfer space 11 of the barrel body 10, the hydrogel particles may be supplied with a uniform pressure to the perforated plate 40 to be described later. This will be described in more detail while describing the perforated plate 40 below.

The transfer unit 20 for transferring the hydrogel transferred to the transfer space 11 in the direction of the discharge portion 16 may be installed in the barrel body 10.

The transfer unit 20 may include a screw member 21 rotatably installed in the transfer space 11 and a driving motor 23 providing a rotational driving force to the screw member 21.

The screw member 21 may be installed to have a long length in the length direction of the barrel body 10 in the transfer space 11 and may be installed to transfer the hydrogel passing through and transferred to the transfer space 11 in the direction of the discharge portion 16.

The driving motor 23 may be installed above the barrel body 10, and a driving shaft thereof may be connected to an end of the screw member 21 to provide a rotational driving force to the screw member 21.

The driving motor 23 and the screw member 21 may be installed to transmit a rotational driving force through a speed reducer (not shown).

Meanwhile, the screw member 21 may be installed so that the cutter member 30 rotates together with the rotation of the screw member 21.

The cutter member 30 is rotatably installed at the position of the discharge portion 16 formed in the barrel body 10 in the screw member 21, and may be installed to appropriately pulverize the hydrogel transferred in the transfer space 11 by the screw member 21.

In this exemplary embodiment, the cutter member 30 will be exemplarily described as being installed at one end of the screw member 21. However, the cutter member 30 is not necessarily limited to being installed as one at the end of the screw member 21, and may be appropriately changed and applied to be installed in a plurality of at least two or more corresponding to the amount of transfer of the hydrogel.

Meanwhile, the hydrogel pulverized by the cutter member 30 may be extruded and discharged by the perforated plate 40.

The perforated plate 40 is installed in a position of the discharge portion 16 of the barrel body 10, and a plurality of cut holes may be formed therein. Therefore, the hydrogel pulverized by the cutter member 30 may be pressed and moved inside the barrel body 10 by a pressing force generated by a rotational operation of the screw member 21, and may be stably discharged through the cut holes in the perforated plate 40.

The perforated plate 40 may be formed of a heat-treated metal and may stably support the pressing force for transferring the hydrogel.

Here, the barrel body 10 may be vertically installed on the support base 14 to face the direction of gravity, and the pressing force generated according to the rotational operation of the screw member 21 may be uniformly applied to the surface of the perforated plate 40.

Therefore, the hydrogel may be uniformly pressed to the surface of the perforated plate 40, while being transferred in the transfer space 11 of the barrel body 10, and thus, the hydrogel may be uniformly chopped, while passing through the cut holes of the perforated plate 40.

As described above, in the superabsorbent polymer hydrogel chopping device 100 of this exemplary embodiment, in a state in which the barrel body 10 is installed so that the discharge portion 16 faces in the direction of gravity, the hydrogel may be chopped, while passing through the perforated plate 40. Therefore, the hydrogel is chopped in a uniformly pressurized state on the perforated plate 40, so that the hydrogel is uniformly chopped to improve manufacturing quality of the absorbent polymer.

Figure 4:
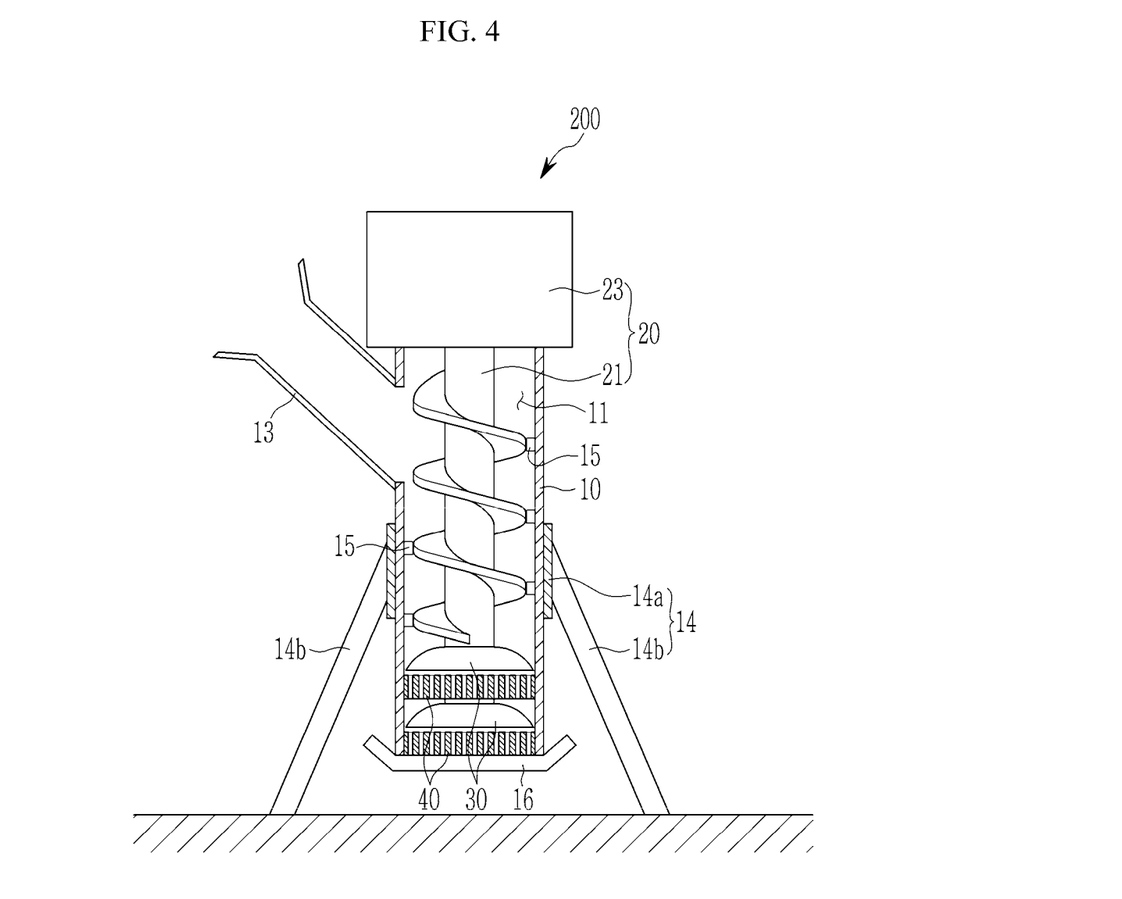
FIG. 4 is a cross-sectional view of a major portion schematically illustrating a superabsorbent polymer hydrogel chopping device according to a second exemplary embodiment of the present invention.

FIG. 4 is a cross-sectional view of a major portion schematically illustrating a superabsorbent polymer hydrogel chopping device according to a second exemplary embodiment of the present invention. The same reference numerals as those in FIGS. 1 to 3 refer to the same or similar members having the same or similar functions. Hereinafter, detailed descriptions of the same reference numerals will be omitted.

As shown in FIG. 4, the cutter member 30 and the perforated plate 40 of the superabsorbent polymer hydrogel chopping device 200 according to the second exemplary embodiment of the present invention are installed in plurality on the screw member 21.

Therefore, it is possible to pulverize the hydrogel using the plurality of cutter members 30 according to a rotational operation of the screw member 21, so that it is possible to effectively pulverize the hydrogel.

Figure 5:
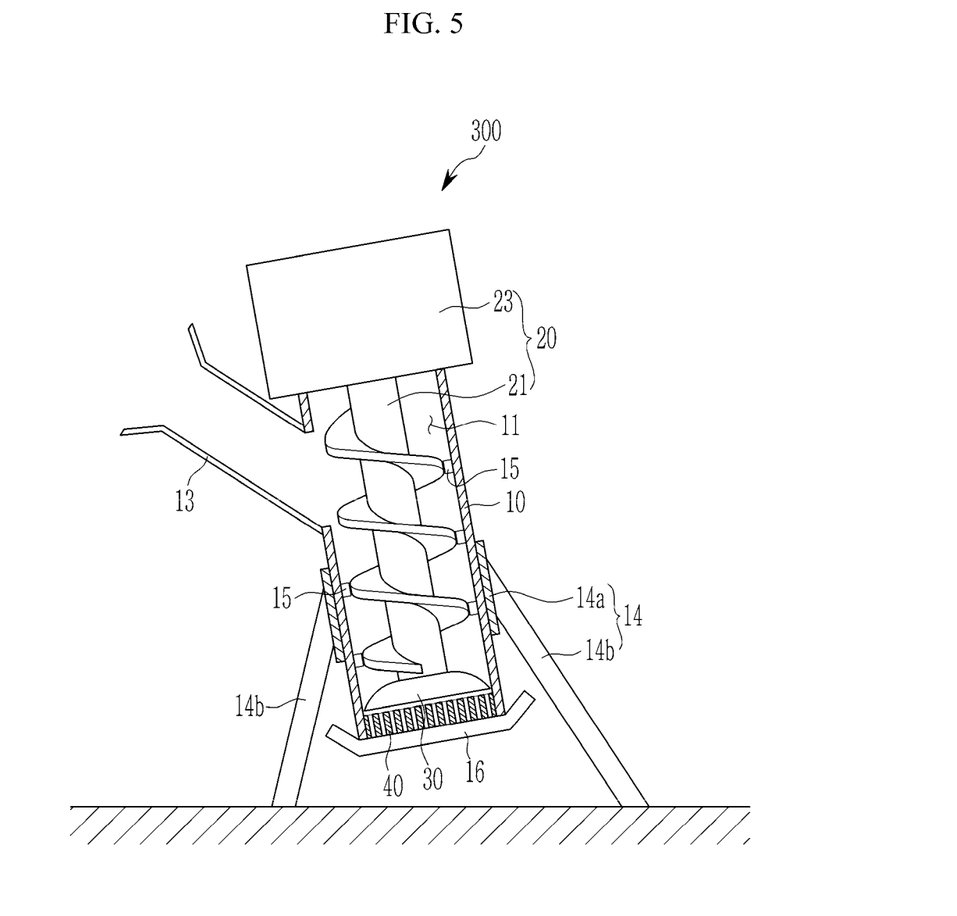
FIG. 5 is a cross-sectional view of a major portion schematically illustrating a state in which a superabsorbent polymer hydrogel chopping device according to a third exemplary embodiment of the present invention is installed to be inclined to one side.
Figure 6:
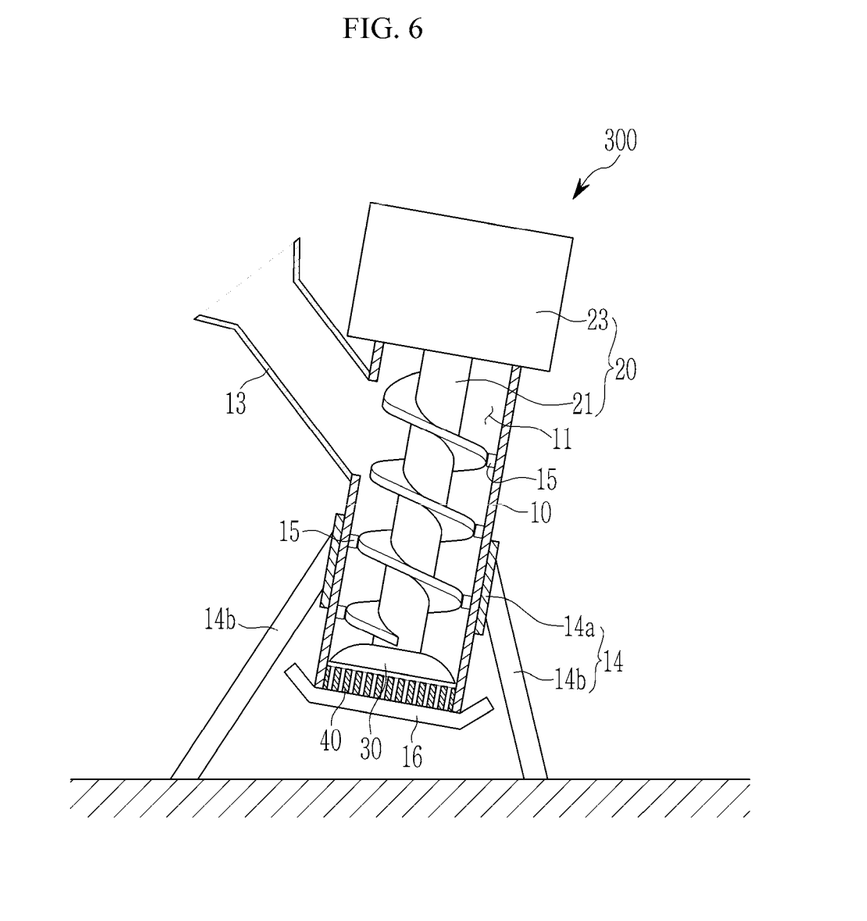
FIG. 6 is a cross-sectional view of a major portion schematically illustrating a state in which the superabsorbent polymer hydrogel chopping device of FIG. 5 is installed to be inclined to the other side.

FIG. 5 is a cross-sectional view of a major portion schematically illustrating a state in which a superabsorbent polymer hydrogel chopping device according to a third exemplary embodiment of the present invention is installed to be inclined to one side, and FIG. 6 is a cross-sectional view of a major portion schematically illustrating a state in which the superabsorbent polymer hydrogel chopping device of FIG. 5 is installed to be inclined to the other side. The same reference numerals as those in FIGS. 1 to 4 refer to the same or similar members having the same or similar functions. Hereinafter, detailed descriptions of the same reference numerals will be omitted.

As shown in FIGS. 5 and 6, the barrel body 10 of a hydrogel chopping device 300 according to the third exemplary embodiment of the present invention may be installed to be inclined in one or the other direction in the support base 14 in a direction staggered with respect to the direction of gravity in the support base 14.

The barrel body 10 may be installed to be inclined in a direction staggered with respect to the direction of gravity in a state in which it is installed on the support base 14.

That is, the discharge portion 16 of the barrel body 10 may be installed to be inclined at an obtuse angle or an acute angle with respect to the direction of gravity of the ground.

Therefore, the hydrogel may be moved along an internal space of the barrel body 10 and is chopped in the perforated plate 40, so that a stable chopping operation may be performed in a state in which a sudden drop of the hydrogel does not occur.

Figure 7:
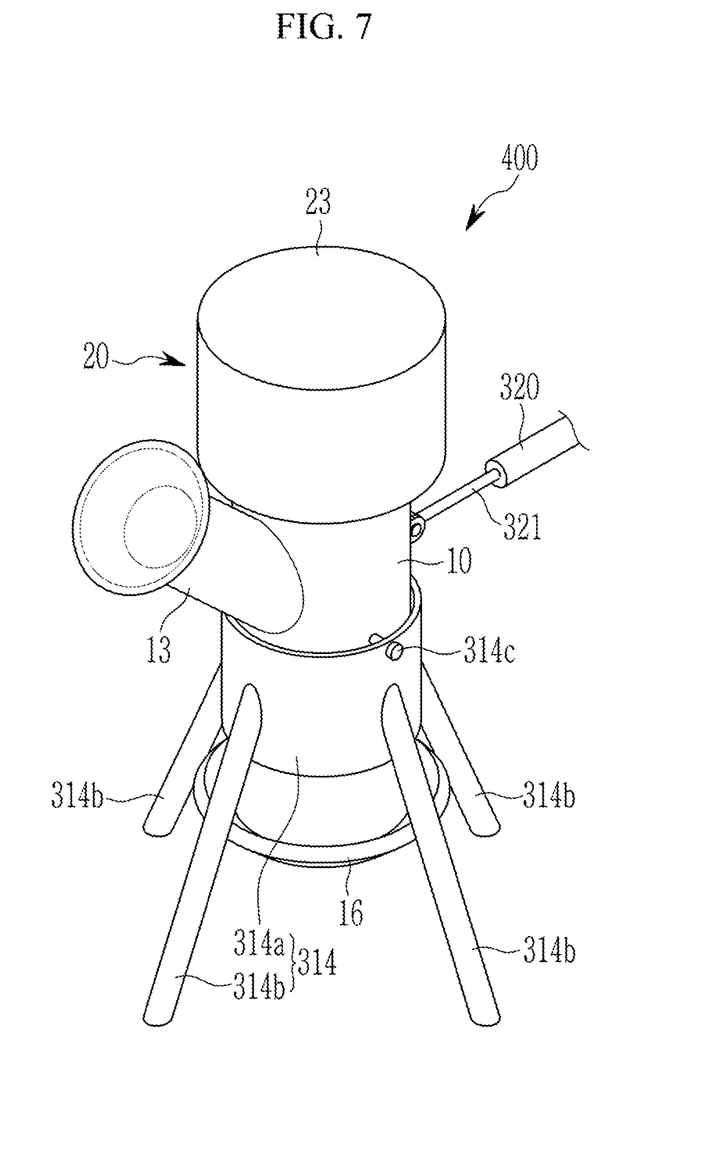
FIG. 7 is a perspective view schematically illustrating a superabsorbent polymer hydrogel chopping device according to a fourth exemplary embodiment of the present invention.

FIG. 7 is a perspective view schematically illustrating a superabsorbent polymer hydrogel chopping device according to a fourth exemplary embodiment of the present invention. The same reference numerals as in FIGS. 1 to 6 refer to the same or similar members having the same or similar functions. Hereinafter, detailed descriptions of the same reference numerals will be omitted.

As shown in FIG. 7, the barrel body 10 of the superabsorbent polymer hydrogel chopping device 400 according to the fourth exemplary embodiment of the present invention may be rotatably installed on the support base 314.

More specifically, the support base 314 may include a support body 314a annularly installed in a state of being spaced apart from an outer surface of the barrel body 10 from a side surface of the barrel body 10, a plurality of support bars 314b protruding from the support body 314a and supported on the floor surface, and a hinge portion 314c rotatably connecting the support body 314a and the side surfaces of the barrel body 10.

The support body 314a is installed in an annular shape so that a rotational space is formed between the support body 314a and the outer surface of the barrel body 10, and may be installed to be rotatably connected to the side surface of the barrel body 10 by the hinge portion 314c.

The barrel body 10 may be installed in a state in which a rotation angle may be changed according to a driving operation of the driving unit 320.

The driving unit 320 may be installed as a cylinder member transmitting a rotational force to the barrel body 10. Hereinafter, the driving unit and the cylinder member use the same reference numeral.

The cylinder member 320 and the rod 321 may be rotatably installed on the barrel body 10. Therefore, a rotation angle of the barrel body 10 installed in the support base 14 is changed according to an operation of the rod 321 of the cylinder member 320, and thus, a smooth chopping operation may be performed by adjusting a transfer angle appropriately to correspond to a transfer amount of the hydrogel.

Figure 8:
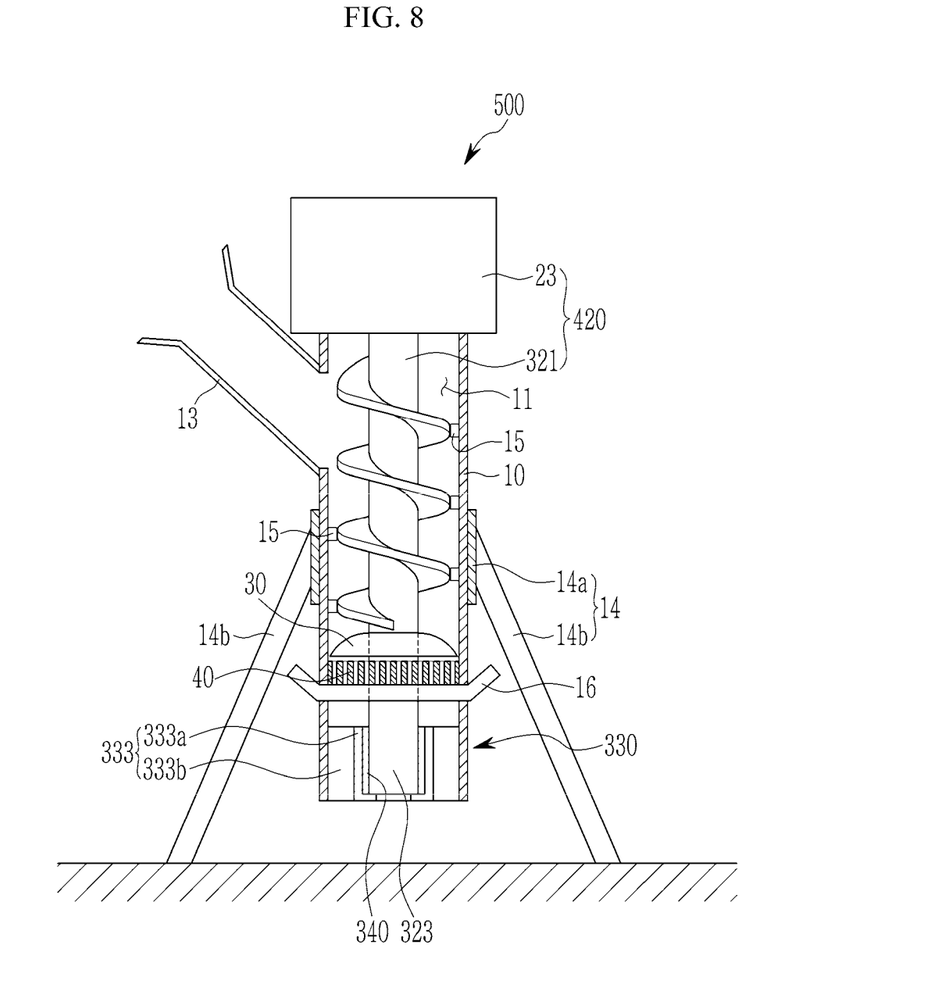
FIG. 8 is a cross-sectional view of a major portion schematically illustrating a superabsorbent polymer hydrogel chopping device according to a fifth exemplary embodiment of the present invention.
Figure 9:
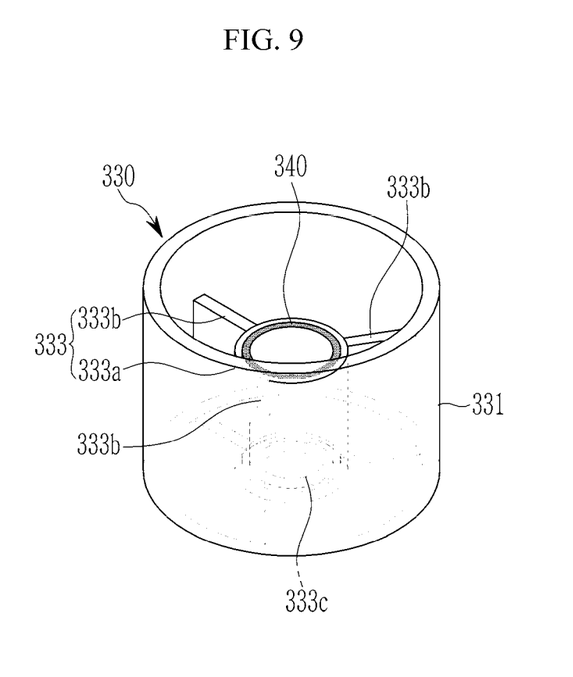
FIG. 9 is a perspective view schematically illustrating a support portion of FIG. 8.
Figure 10:
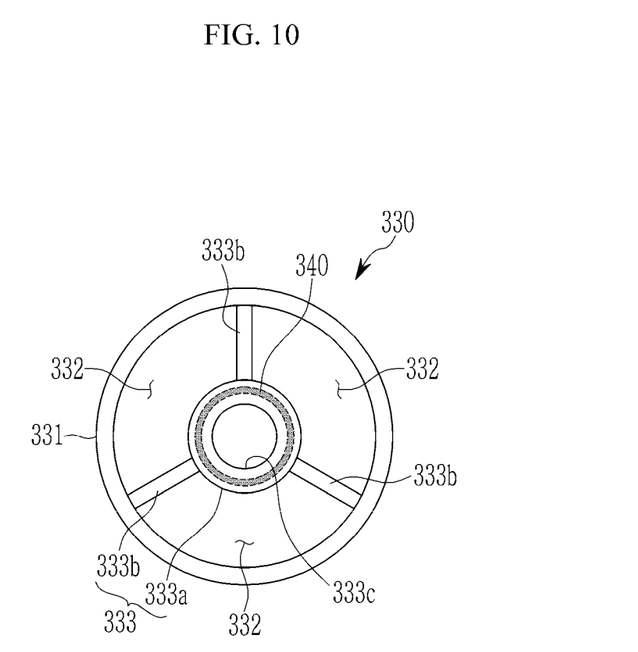
FIG. 10 is a bottom view schematically illustrating the support portion of FIG. 9.

FIG. 8 is a cross-sectional view of a major portion schematically illustrating a superabsorbent polymer hydrogel chopping device according to a fifth exemplary embodiment of the present invention, FIG. 9 is a perspective view schematically illustrating a support portion of FIG. 8, and FIG. 10 is a bottom view schematically illustrating the support portion of FIG. 9. The same reference numerals as those in FIGS. 1 to 7 refer to the same or similar members having the same or similar functions. Hereinafter, detailed descriptions of the same reference numerals will be omitted.

As shown in FIGS. 8 to 10, a transfer unit 420 of a superabsorbent polymer hydrogel chopping device 500 according to the fifth exemplary embodiment of the present invention may include a screw member 321 rotatably installed inside the transfer space 11 and moving hydrogel, a driving motor 23 connected to one end of the screw member 321 to provide a rotational driving force, a screw extension portion 323 extending from the other end of the screw member 321 and protruding to the outside of the discharge portion 16, and a support portion 330 installed outside the discharge portion 16 to support the screw extension portion 323.

The screw member 321 may be installed in the transfer space 11 to transfer the hydrogel in the direction of the discharge portion 16, and one end of the screw member 321 may be connected to the driving motor 23 and the screw extension portion 323 may be installed at the other end of the screw member 321.

The screw extension portion 323 is installed in an extended state at the other end of the screw member 321, and may be inserted into the support portion 330 so as to be rotationally supported.

The support portion 330 is installed in a state of protruding to the outside of the discharge portion 16, and is integrally formed with the discharge portion 16 to rotatably support the screw extension portion 323 from the outside of the discharge portion 16.

More specifically, the support portion 330 may include a support housing 331 protruding to the outside of the discharge portion 16 and having a discharge space 332 into which pulverized hydrogel particles are discharged and a rotation support portion 333 installed in the support housing 331 and rotatably supporting the screw extension portion 323.

The support housing 331 protrudes to the outside of the discharge portion 16, and may be integrally formed with the discharge portion 16 to protrude to the outside of the discharge portion 16. The support housing 331 is formed in a cylindrical shape and the discharge space 332 through which the pulverized hydrogel particles may be discharged to the outside may be formed therein.

The rotation support portion 333 is installed inside the support housing 331, and a portion of the screw extension portion 323 may be rotatably inserted therein.

As described above, since the screw extension portion 323 is rotatably inserted into the rotation support portion 333, a load of the screw member 321 may be stably supported. Therefore, the screw member 321 may be stably rotatably supported by the rotation support portion 333 in a state of being installed in the ground direction and may be structurally stabilized to improve durability.

More specifically, the rotation support portion 333 may include an insertion portion 333a installed in the discharge space 332 of the support housing 331 and rotatably supporting the inserted screw extension portion 323 and a plurality of ribs 333b connecting the insertion portion 333a to an inner wall surface of the support housing 331.

The insertion portion 333a may be installed inside the support housing 331, and the screw extension portion 323 may be inserted therein and an arrest protrusion 333c may be formed therebelow, so that the screw extension portion 323 may be rotatably supported.

A bearing member 340 may be installed inside the insertion portion 333a, so that the screw extension portion 323 may be stably rotatably supported.

A plurality of ribs 333b may be connected between an outer surface of the insertion portion 333a and the inner wall surface of the support housing 331, so that the insertion portion 333a may be stably installed inside the support housing 331.

As described above, in the fifth exemplary embodiment, since the load of the screw member 321 is supported by the support portion 330, the transfer and pulverization process of the hydrogel may be stably performed in a state in which durability is secured.

Although preferred exemplary embodiments of the present invention have been described above, the present invention is not limited thereto, and various modifications and variations are possible within the scope of the claims, the detailed description of the invention, and the accompanying drawings. It is natural to fall within the scope of.

(Description of reference numerals)

| | |
|---|---|
| 10. first barrel body | 11. transfer space |
| 13. input hopper | 14. support base |
| 14a. support body | 14b. support bar |
| 15. barrel spiral | 16. discharge portion |
| 20, 420. transfer unit | 21, 321. screw member |
| 23. driving motor | 30. screw member |
| 40. perforated plate | 320. driving unit, cylinder member |
| 321. rod | 323. screw extension portion |
| 330. support portion | 331. support housing |
| 333. rotation support portion | 333a. insertion portion |
| 333b. rib | 333c. arrest protrusion |
| 340. bearing member | |

The invention claimed is:

1. A superabsorbent polymer hydrogel chopping device, comprising:
a barrel body having: a transfer space to which a hydrogel is transferred therein; and a discharge portion through which the hydrogel is discharged towards ground;
a transfer unit located in the transfer space of the barrel body to transfer the hydrogel in the transfer space;
at least one cutter member located in the transfer space of the barrel body to pulverize the hydrogel transferred by the transfer unit; and
a perforated plate to discharge particles of the hydrogel pulverized by the at least one cutter member to outside of the barrel body,
wherein the superabsorbent polymer hydrogel chopping device further comprises a support base and a driving unit,
wherein the support base includes:
a support body having an annular shape and spaced apart from an outer surface of the barrel body on a side surface of the barrel body;
a plurality of support bars protruding from the support body to support the barrel body on the floor surface; and
a hinge portion to connect the support body to the side surface of the barrel body,
wherein the barrel body is placed at the support base by a driving operation of the driving unit and
wherein the driving unit is a cylinder member in which a rod is connected to the side surface of the barrel body.

2. The superabsorbent polymer hydrogel chopping device of claim 1, wherein:
the barrel body is placed in a direction that the discharge portion faces towards ground.

3. The superabsorbent polymer hydrogel chopping device of claim 2, further comprising:
an input hopper attached to a side surface of the barrel body to inject the hydrogel into the transfer space, and inclined relative to the side surface of the barrel body.

4. The superabsorbent polymer hydrogel chopping device of claim 3, wherein the support base is placed on a floor surface, and the barrel body is provided with the support base.

5. The superabsorbent polymer hydrogel chopping device of claim 4, wherein:
the barrel body is placed to be inclined relative to the support base and not perpendicular to the ground.

6. The superabsorbent polymer hydrogel chopping device of claim 1, wherein:
the transfer unit includes:
a screw member which rotates in the transfer space to move the hydrogel; and
a driving motor to provide a rotation driving force to the screw member.

7. The superabsorbent polymer hydrogel chopping device of claim 6, wherein:
the at least one cutter member is attached to the screw member in a position of the discharge portion.

8. The superabsorbent polymer hydrogel chopping device of claim 7, wherein:
two or more of the at least one cutter members are attached to the screw member.

9. The superabsorbent polymer hydrogel chopping device of claim 7 wherein:
the transfer unit includes:
the screw member located in the transfer space and configured to move the hydrogel;
the driving motor connected to one end of the screw member and configured to provide a rotational driving power;
a screw extension portion extending from the other end of the screw member and protruding to outside of the discharge portion; and
a support portion attached to an outer side of the discharge portion and configured to support the screw extension portion.

10. The superabsorbent polymer hydrogel chopping device of claim 9, wherein:

the support portion includes:
a support housing protruding to the outside of the discharge portion and including a discharge space to which the pulverized hydrogel particles are discharged; and
a rotation support portion located in the support housing to support the screw extension portion.

11. The superabsorbent polymer hydrogel chopping device of claim 10, wherein:
the rotation support portion includes:
an insertion portion located in the discharge space of the support housing to support the inserted screw extension portion; and
a plurality of ribs to connect the insertion portion to an inner wall surface of the support housing.

12. The superabsorbent polymer hydrogel chopping device of claim 11, wherein:
a bearing member to support the screw extension portion is located in the insertion portion.

* * * * *